(12) United States Patent
Alam et al.

(10) Patent No.: US 8,946,351 B2
(45) Date of Patent: Feb. 3, 2015

(54) ENVIRONMENTAL FRIENDLY POLY(ETHER-FATTYAMIDE) RESIN COMPOSITION

(71) Applicant: King Saud University, Riyadh (SA)

(72) Inventors: Manawwer Alam, Riyadh (SA); Naser M. Alandis, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/680,328

(22) Filed: Nov. 19, 2012

(65) Prior Publication Data

US 2014/0142246 A1    May 22, 2014

(51) Int. Cl.
*C08G 69/26* (2006.01)
*C08G 69/00* (2006.01)

(52) U.S. Cl.
CPC .................................... *C08G 69/00* (2013.01)
USPC .......................................... 524/606; 528/211

(58) Field of Classification Search
None
See application file for complete search history.

(56) References Cited

U.S. PATENT DOCUMENTS

| | | | |
|---|---|---|---|
| 4,220,679 A | 9/1980 | Backhouse | |
| 6,225,434 B1 | 5/2001 | Sadvary et al. | |
| 6,329,060 B1 * | 12/2001 | Barkac et al. | 428/423.1 |
| 6,452,018 B1 | 9/2002 | Riva et al. | |
| 7,737,223 B2 | 6/2010 | Valenta et al. | |

FOREIGN PATENT DOCUMENTS

| | | |
|---|---|---|
| CN | 101081957 A | 12/2007 |
| DE | 102005010947 A1 | 9/2006 |

OTHER PUBLICATIONS

Ahmad et al. Progress in Organic Coatings, 52, (2005) 85-91.*
Sharmin et al. Chapter 18, Seed Oil Based Polyurethanes: An Insight, pp. 412 and 424.*
Ash et al. Handbook of Rheology Modifiers, (2008), p. v.*

* cited by examiner

*Primary Examiner* — Susannah Chung
*Assistant Examiner* — Robert T Butcher
(74) *Attorney, Agent, or Firm* — Lowe Hauptman & Ham, LLP

(57) ABSTRACT

An environmental friendly poly(ether-fattyamide) coating composition for mild steel plates or the like comprises and/or consists of a condensation polymerization product of a fatty diol and an aromatic/cyclic diol and wherein the fattyamide diol is synthesized using rapeseed oil and further cured with an aminoplast resin and a catalyst. The rapeseed oil is combined with a crosslinker such as hexa methoxy melamine formaldehyde, butylated melamine formaldehyde, urea formaldehyde of hydroxyl values of 220-240 mg KOH/gm of resin and curing catalysts. The curing catalyst may be para toluene sulphonic acids, dodecyl sulphonic acids, orthro phosphoric acid in a solvent such as xylene, ethyl methyl ketone, ethylene glycol mono methyl ether and aromatic hydrocarbons. Additional agents such as surfactants, stabilizers, wetting agents, flow modifiers, dispersing agents, adhesion promoters and UV absorbers may be added.

6 Claims, No Drawings

ENVIRONMENTAL FRIENDLY POLY(ETHER-FATTYAMIDE) RESIN COMPOSITION

FIELD OF THE INVENTION

This invention relates to an environmental friendly poly (ether-fattyamide) resin composition and more particularly to a polymerization product of fattyamide diol and an aromatic/cyclic diol and wherein the fattyamide-diole is synthesized using rapeseed oil and further cured with aminoplast resin and a catalyst.

BACKGROUND FOR THE INVENTION

Environmental friendly coating compositions such as paint, varnish and coatings drying at room temperature using autoxidation catalyst like driers cobalt octoate, naphthenate and molecular weight of 5000 to above 100,000 are known. The composition includes tall oil, dipentaerythritol, pentaerythritol, isophthalic acid, phthalic anhydride with a thickness of the coating of about 100-200 µm and a viscosity of 5 poise with an acid value of 9 to 11 mg KOH/gm.

Additionally, a search of the United States Patent and Trademark Office art disclosed the following U.S. Patents.

The prior art references include U.S. Pat. No. 4,220,679 of Backhouse. The Backhouse patent discloses a coating process for automobile bodies that include polymers of cross-linking type using formaldehyde with urea or melamine-formaldehyde. Please note that the polymer solvents disclosed include hydrocarbons and can include aromatic hydrocarbons such as toluene and xylene. Fatty acids used may be those derived from linseed oil, soya bean oil, tall oil, dehydrated caster oil, fish oils or tung oil.

A further U.S. Pat. No. 6,225,434 of Sadvary et al. discloses a composition having improved scratch resistance as applied to motor vehicles. The composition includes various weights with urea and catalysts with alcohols including ethylene glycol and methyl ether. The curing agents include melamine or urea combined with formaldehyde. Fatty acids used may be those derived from linseed oil, soya bean oil, tall oil, dehydrated caster oil, fish oils or tung oil. Optional ingredients include plasticizers, surfactants, thixotropic agents, anti-gassing agents, anti-oxidants and UV light absorbers with solvents including aromatic solvents.

A third U.S. Pat. No. 6,452,018 of Riva et al. discloses hydroxyphenols useful as heat, oxygen and UV light stabilizers for organic polymers. The patent discloses resins based on unsaturated polyesters with cross-linking by urethane acrylates. The patent further discloses multilayer systems of 10-100 micrometers thickness with high resistance to UV light. The stabilizers include melamine, urea with fatty-acids of stearate and palmitate.

An additional U.S. Pat. No. 7,737,223 of Valenta et al. discloses a pigment free amine-hydroxyl polymer using monomers including ethyl methyl acrylate. Cross-linking agents can be formaldehyde with an amine or amide including melamine or urea.

In addition to the above, the search disclosed a German Patent No. DE 10 2005 010 947 of Glockner et al. that discloses a primer for automotive coating with improved stone impact protective effect with polymers of polyether, and phenol-urea aldehyde with melamine resins.

Finally, a Chinese Patent No. CN 101081957 of Bao C et al. discloses an automotive finish with methyl acrylic ester monomers with a functional monomer with hydrophilic group cross-linked with a solidifier.

Notwithstanding the above, it is presently believed that there is a need and a potential commercial market for an environmental friendly poly(ether-fattyamide) resin or coating composition in accordance with the present invention. There should be a commercial market for such products because they combine the mechanical strength and stability of poly(ether-fattyamide) coating materials and excellent properties in terms of flexibility, gloss, scratch hardness, impact resistance and tests on coated panels in accordance the present invention.

SUMMARY OF THE INVENTION

In essence, the present invention contemplates an environmental friendly poly(ether-fattyamide) resin composition or coating for metal steel plates or the like. The composition comprises and/or consists of a condensation polymerization product of a fattyamide diol and an aromatic/cyclic diol and wherein the fattyamide diol is synthesized using rapeseed oil and further cured with an aminoplast resin and a catalyst.

To be more specific, the rapeseed oil is combined with a crosslinker such as hexa methoxy melamine formaldehyde, butylated melamine formaldehyde, urea formaldehyde of hydroxyl values of 220-240 mg KOH/gm of resin and curing catalysts. The curing catalyst may be para toluene sulphonic acids, dodecyl sulphonic acids, orthro phosphoric acid in a solvent such as xylene, ethyl methyl ketone, ethylene glycol mono methyl ether and aromatic hydrocarbons.

Additional agents such as surfactants, stabilizers, wetting agents, flow modifiers, dispensing agents, adhesion promoters and UV absorbers may be added.

The coating composition is applied to a mild steel panel and cured at 200° or about 200° C. for 10 minutes or about 10 minutes that results in a coating of 100 to 150 microns.

The invention also contemplates a method for making an environmental friendly poly(ether-fattyamide) coating composition as will be described hereinafter.

The compositions disclosed herein combines the mechanical strength and stability of poly(ether-fattyamide) coating materials with excellent properties in terms of flexibility, gloss, scratch hardener, impact resistance and tests on a coated panel.

The compositions combine the mechanical strength and stability of poly(ether-fattyamide) coating materials with excellent properties in term of flexibility, gloss, scratch hardness, impact resistance and tests of a coated panel in accordance with the present invention. Poly(ether-fattyamide) resin was prepared by the condensation polymerization of fattyamide diol and aromatic/cyclic diol in the presence of an acid catalyst like para toluene sulphonic acid. The poly(ether-fattyamide) resin was mixed with an aminoplast resin and applied on mild steel panels and cured at about 200° C. for 10 minutes.

DETAILED DESCRIPTION OF THE INVENTION

The coating formulation of the invention depends on poly (ether-fattyamide) resin and a crosslinking agent. In Applicants' invention, vegetable oil like rapeseed oil was converted into a fattyamide diol by an aminolysis reaction. Preparation of poly(ether-fattyamide) resins was by condensation polymerization of a fattyamide diol and an aromatic/cyclic diol such as bisphenol A, catechol, resorcinol, hydroquinone, cyclo hexane dimethanol with an acid catalyst.

Poly(ether-fattyamide) showed the high flexibility due to presence of an alkyl chain of oil. Applicants' invention used mixed moieties those show moderate properties in term of flexibility and hardness and also depends upon the combination of moieties were used. The poly(ether-fattyamide) resin synthesis carried out under suitable conditions such as temperature from 170 to 180° C. with catalyst, like para toluene sulphonic acid (PTSA) and removed water as by product using dean stalk trap, further azeotropic distillation under vacuum to complete the reaction. The poly(ether-fattyamide) resin has hydroxyl value of about 20-40 mg KOH/gm. The poly(ether-fattyamide) resin has a number average molecular weight around 5,000 to 10,000 and polydispersity between 1.5 to 2.0, number average molecular weight and polydispersity index was determined by Gel Permeation Chromatography (GPC) using polystyrene standards.

The coating formulation further includes a crosslinker. The crosslinking agent has 6 reactive groups with a hydroxyl group of the polyetheramide resin. A suitable aminioplast agent one or a combination of two such as melamine formaldehyde, hexa methoxy methyl melamine, urea formaldehyde resins were used. The poly(ether-fattyamide) resin and amino resin weight ratio is generally between 90:10 and 70:30 (based on solid). Particularly preferred are melamine resins especially fully alkylated melamine resins (Cymel 303LF) and urea resins. A mixture of crosslinking agents may be used. The coating composition may include a catalyst to curing the reaction. The amount of catalyst used about 0.1 to 2.0% wt based on binder weight. Amino resin especially melamine resin are used as a curing agent, para toluene sulphonic acid, phosphoric acid, di alkyl phosphates.

Additional agents for example surfactants, stabilizers, wetting agents, and flow modifiers, dispersing agents, adhesion promoters, UV absorbers etc may be incorporated into the coating formulation. The amounts of additives used to control and avoid adversely affecting the coating properties. The role of solvents is very important in the coating composition. In general, a mixture of organic solvent is used in the formulation of coating aromatic hydrocarbon for example ketones, methyl ethyl ketone, methyl iso butyl ketone, ethylene glycol mono methyl ether, ethylene glycol mono butyl ether acetate, xylene, toluene, N-methylpyrolidone.

Test Methods
  Cupping Test Adhesion
BS 3900E4 (cupping test adhesion) is used to measure the adhesion of the coating using Cupping Tester (Sheen Instruments Ltd England).
  Film Thickness
A minimum of 3 readings are taken and averaged using an Elcometer Model 345 (Elcometer Instruments, Manchester, England).
  Gloss Test
A minimum of 3 readings are taken and averaged using a Tri-Glossmaster (Sheen Instruments Ltd England) according to the method of ASTM D523.
  Impact Test
Impact resistance of the coating is measured by using a Tubular Impact Tester (Sheen Instruments Ltd England) according to the method of ASTM D2794-93.
  MEK Resistance—Double Rubs
Methyl ethyl ketone (MEK) is used to determine the solvent resistance according to ASTM D5402. The number of double rubs (DR) is recorded when delamination/degradation of the film.
  Pencil Hardness
Pencil hardness is measured according to ASTM D3363.
  Scratch Hardness
The scratch hardness is measured on the cured coating using Mechanised Scratch Tester (Sheen Instruments England) according to the method of ASTM D5178.

Weather Resistance

Gloss was measured after 750 hour exposure in sunshine weather-O-meter.

Materials

Rapeseed oil (*Brassica napus*), Diethanolamine (Fluka, Switzerland), Toulene-4-Sulphonic acid (BDH Chemicals Ltd, Poole, England), Resorcinol, Bisphenol A, catechol, (Merck, India), Hydroquinone (Avonchem, Cheshire, UK), Xylene, Toluene, phosphoric acid. Cymel 303 LF (highly methylated melamine resin) (Cytec Company, Belgium).

Preparation of N,N-bis(2-hydroxy Ethyl) Rapeseed Oil Fatty Amide(HERA)

Rapeseed oil (100 gm), diethanolamine (120 gm) and (0.50 gm) freshly prepared sodium methoxide (sodium metal dissolved in methanol) were taken in a round bottom flask. The charge was heated to 125° C. and maintained at that temperature for about 30 mins. The completion of the reaction was measured by thin layer chromatography (TLC), ethyl acetate using mobile phase. After cooling the product was dissolved in diethyl ether and 15 wt % aqueous NaCl solution added and then mixed thoroughly and kept in a separating funnel after few minutes clearly shown two layered, upper layer ethereal layer and lower layer aqueous. Lower layer discarded and upper layer taken in round bottom flask and removed ether using rotary vacuum evaporator, dried over anhydrous sodium sulphate. To obtained semi solid viscous light yellow colour product (HERA).

EXAMPLE 1

A reactor fitted with a fractional column, condenser, and decanter was charged with 66wt % HERA, 6.00 wt % Bisphenol A, 5.00 wt % cyclohexanedimethanol (CHDM), 10.50 wt % Resorcinol, 11.50 wt %, Catechol and 1.00 wt % para toluene sulphonic acid (PTSA) catalyst. The contents were heated at 175° C. and maintained the fractional head temperature at around 100° C. when the resin showed the transparent then shift the azeotropic distillation and remove the water, add aromatic solvent like xylem, toluene in the reaction kettle and maintain the temperature around 180-200° C., measured hydroxyl value at regular intervals, when the hydroxyl value till the constant (desired value). When the hydroxyl values constant then lower the temperature of the product and add the solvent to maintain the solid and viscosity.

EXAMPLE 2-5

Repeating the same procedure as described in Example 1, but using a different material with different percentages as shown in Table 1 and their coating properties of a coated panel as shown in Table 2.

Coatings Formulation

Poly(ether-fattyamide) resin (example 1 to 5) mixed with 30 wt % Cymel 303LF (a commercial grade hexamethoxymethylmelamine supplied in liquid form the compound is versatile crosslinking agent for a wide range of polymeric materials both organo-soluble and water borne) in solvent blend (xylene and ethyl methyl ketone; 1:1), presence of phosphoric acid as a catalyst (about 1.25%). The mixture was heated with stirred for 30 minutes at 70° C. to obtain a homogeneous mixture. This prepared coating material applied on mild steel panel (Fe=99.51%, Mn=0.34%, C=0.10%, P=0.05%) and baked at 200° C. for 10 minutes.

TABLE 1

Poly(ether-fattyamide) resins compositions % wt

| Materials | Example 1 | Example 2 | Example 3 | Example 4 | Example 5 |
|---|---|---|---|---|---|
| HERA | 66.00 | 65.00 | 65.00 | 66.00 | 66.00 |
| Bisphenol A | 6.00 | 5.00 | 5.00 | 5.00 | — |
| CHDM | 5.00 | 5.00 | 5.00 | 5.00 | 4.00 |
| Resorcinol | 10.50 | 14.00 | 10.00 | 10.00 | 20.00 |
| Catechol | 11.50 | 10.00 | 14.00 | 10.00 | 6.00 |
| Hydroquinone | — | — | — | 3.00 | 3.00 |
| Catalyst (PTSA) | 1.00 | 1.00 | 1.00 | 1.00 | 1.00 |

TABLE 2

Properties of poly(ether-fattyamide) resins and coatings

| | Examples | | | | |
|---|---|---|---|---|---|
| | 1 | 2 | 3 | 4 | 5 |
| Resin Specification | | | | | |
| Solid (%) | 82 | 80 | 81 | 80 | 80 |
| OH value | 25 | 22 | 28 | 30 | 38 |
| Viscosity (poise) (25° C.) | 45 | 45 | 40 | 35 | 34 |
| Test Results | | | | | |
| Gloss at 60° | 88 | 78 | 75 | 75 | 70 |
| Pencil Hardness | 5H | 4H | 4H | 3H | 3H |
| Scratch Hardness (gm) | 2200 | 2100 | 2050 | 1800 | 1500 |
| Cupping Test (80 mm) | Pass | pass | Pass | pass | pass |
| Bending Test | 0T | 0T | 0T | 0T | 0T |
| Impact Test | Pass | pass | Pass | pass | pass |
| MEK (DR) | 50 | 40 | 43 | 35 | 30 |
| Weather resistance | 80 | 75 | 74 | 70 | 66 |

While the invention has been disclosed in connection with its preferred embodiments it should be recognized that changes and modifications may be made therein without departing from the scope of the claims.

What is claimed is:

1. An environmental friendly poly(ether-fattyamide) resin composition, said composition comprising a condensation polymerization product of fattyamide diol and an aromatic/cyclic diol and wherein said fattyamide-diol is synthesized using rapeseed oil and further cured with aminoplast resin and an acid catalyst in which said acid catalyst is selected from the group consisting of para toluene sulphonic acid, dodecyl sulphonic acid, orthophosphoric acid and mixtures thereof and wherein said rapeseed oil is combined with a crosslinker selected from the group consisting of hexa methoxy melamine formaldehyde, butalated melamine formaldehyde, urea formaldehyde and mixtures thereof, and wherein said curing catalyst is in a solvent selected from the group consisting of xylene, ethyl methyl ketone, ethylene glycol mono methyl ether, aromatic hydrocarbons and mixtures thereof and which includes additional agents selected from the group consisting of surfactants, stabilizers, wetting agents, flow modifiers, dispersing agents, adhesion promoters, UV absorbers and mixtures thereof.

2. An environmental friendly poly(ether-fattyamide) resin composition according to claim 1, in which said catalyst is para toluene sulphonic acid.

3. An environmental friendly poly(ether-fattyamide) resin composition according to claim 2, in which said aromatic/cyclic diol is selected from the group consisting of bisphenol A, catechol, resorcinol, hydroquinone and cyclo hexane dimethanol.

4. An environmental friendly poly(ether-fattyamide) resin composition according to claim 3, in which said resin synthesis is carried out at a temperature between about 170° to about 180° C.

5. An environmental friendly poly(ether-fattyamide) resin composition according to claim 4, in which water is removed as a byproduct using a dean stalk trap.

6. An environmental friendly poly(ether-fattyamide) resin composition, said composition consisting of a condensation polymerization product of fattyamide diol and an aromatic cyclic diol and wherein said fattyamide diol is synthesized using rapeseed oil and further cured with aminoplast resin and an acid catalyst selected from the group consisting of para toluene sulphonic acid, dodecyl sulphonic acid, orthro phosphoric acid and mixtures thereof and wherein said rapeseed oil is combined with a crosslinker selected from the group consisting of hexa methoxy melamine formaldehyde, butalated melamine formaldehyde, urea formaldehyde and mixtures thereof, and wherein said curing catalyst is in a solvent selected from the group consisting xylene, ethyl methyl ketone, ethylene glycol mono methyl ether, aromatic hydrocarbons and mixtures thereof and which includes additional agents selected from the group consisting of surfactants, stabilizers, wetting agents, flow modifiers, dispersing agents, adhesion promoters, UV absorbers and mixtures thereof.

* * * * *